(12) United States Patent  
Korkalo et al.

(10) Patent No.: US 7,991,406 B2  
(45) Date of Patent: Aug. 2, 2011

(54) CHANGING SETTINGS OF A MOBILE TERMINAL

(75) Inventors: Tapio Korkalo, Ylöjärvi (FI); Matti Vilppula, Pirkkala (FI); Rami Karjanmaa, Tampere (FI)

(73) Assignee: Nokia Corporation, Espoo (FI)

( * ) Notice: Subject to any disclaimer, the term of this patent is extended or adjusted under 35 U.S.C. 154(b) by 1562 days.

(21) Appl. No.: 10/445,312

(22) Filed: May 23, 2003

(65) Prior Publication Data

US 2004/0235464 A1     Nov. 25, 2004

(51) Int. Cl.  
*H04Q 7/20*     (2006.01)

(52) U.S. Cl. ............... 455/456.3; 455/456.1; 455/412.1; 455/414.2; 455/435.1; 455/418; 455/456.4; 455/456.2

(58) Field of Classification Search ............... 455/456.1, 455/414.2, 457, 419, 404.2, 414.1, 414.3, 455/416  
See application file for complete search history.

(56) References Cited

U.S. PATENT DOCUMENTS

| | | | |
|---|---|---|---|
| 5,479,476 A * | 12/1995 | Finke-Anlauff | 455/566 |
| 6,085,098 A | 7/2000 | Moon et al. | |
| 6,389,288 B1 * | 5/2002 | Kuwahara et al. | 455/456.6 |
| 6,650,902 B1 * | 11/2003 | Richton | 455/456.3 |
| 2002/0123373 A1 * | 9/2002 | Kirbas et al. | 455/567 |

OTHER PUBLICATIONS

U.S. Appl. No. 2002/123373 A1 Publication Date: Sep. 5, 2002.  
U.S. Appl. No. 2002/077144 A1 Publication Date: Jun. 20, 2002.

* cited by examiner

*Primary Examiner* — Charles N Appiah  
*Assistant Examiner* — Randy Peaches  
(74) *Attorney, Agent, or Firm* — Ditthavng Mori & Steiner, P.C.

(57) ABSTRACT

A device enabling a change of settings of applications is implemented in a mobile terminal. In order to facilitate a change of such settings, the device comprises a storage portion for storing a plurality of configurations. Each stored configuration is associated to at least one location and each stored configuration defines settings for applications implemented in the mobile terminal. The device further comprises a controlling portion for receiving information on a current position of the mobile terminal, for retrieving automatically a configuration associated to a location identified by the position information from the storage portion, and for changing settings of applications implemented in the mobile terminal according to the retrieved configuration. The device can be either a mobile terminal, or a module for a mobile terminal. The invention relates equally to a corresponding system and to a corresponding method.

24 Claims, 3 Drawing Sheets

CHANGING SETTINGS OF A MOBILE TERMINAL

FIELD OF THE INVENTION

The invention relates to a device and to a system enabling a change of settings of applications implemented in a mobile terminal. The invention relates equally to a software program product in which a software code for changing settings of applications implemented in a mobile terminal is stored and to a method of changing settings of applications implemented in a mobile terminal.

BACKGROUND OF THE INVENTION

The functions provided by a mobile terminal, like a mobile phone or a laptop, are based on applications implemented in the mobile terminal and on settings defined for each of the applications.

Usually, a part of these settings can be changed by a user. Some mobile terminals allow to change easily only a few settings, like voice and volume settings. Most of today's mobile terminals allow one to change a great variety of useful settings, though. In either case, each of the settings has to be changed manually by a user of the mobile terminal.

There are many different locations or situations, in which most users of a mobile terminal prefer to change the settings of their mobile terminal temporally. Changed settings may be desired e.g. in a church, in a classroom, in a meeting room or in a cinema. Often, however, users forget to change the settings as desired, or they forget later on to change the settings back.

It is thus a disadvantage of known approaches that the user always has to remember to change the settings as desired and that making use of all enabled, advantageous changes of settings is rather annoying.

For the voice settings of some applications, it is known to associate a specific profile to a specific location. Nevertheless, the user has to select the associated profile manually when coming to the location. Moreover, the settings and the corresponding locations are saved to the respective application, i.e. an extra software is needed for each application for saving the settings and the corresponding locations to the respective application. This is of particular disadvantage in case there are many applications for which the settings are to be changed for a specific location.

In Windows®, there is a file called "win.ini", in which settings of applications of a device are saved. The settings are read from this file when Windows® is started. However, this approach relates to the PC environment and it does not take into account the current location of the device when reading the settings.

SUMMARY OF THE INVENTION

It is an object of the invention to facilitate a change of settings in a mobile terminal.

A device is proposed which enables a change of settings of applications implemented in a mobile terminal. The proposed device comprises a storage portion for storing a plurality of configurations. Each stored configuration is associated to at least one location and each stored configuration defines at least one setting for at least one application implemented in a mobile terminal. The proposed device further comprises a controlling portion for receiving information on a current position of a mobile terminal, for retrieving automatically a configuration associated to a location identified by the position information from the storage portion, and for changing settings of applications implemented in the mobile terminal according to the retrieved configuration.

The proposed device can be in particular be a mobile terminal of which settings are to be changed, or a controller module for the mobile terminal. Such a controller module can be implemented for instance by software. The controller module can be integrated into the mobile terminal or be an external unit which is able to change the settings of the mobile terminal by transmitting corresponding configuration signals to the mobile terminal.

Further, a system is proposed, which comprises a mobile terminal having the features of the proposed device, and in addition at least one unit transmitting signals to the mobile terminal. These signals enable the mobile terminal to provide information on the current position of the mobile terminal as position information to the controlling portion. The signals can either include an information on the current position of the mobile terminal or enable the mobile terminal to determine its current position. The units transmitting signals to the mobile terminal can be for instance GPS (Global Positioning System) satellites, base stations of a mobile communication network, units of a WLAN (Wireless Local Area Network) and/or Bluetooth™ units.

Moreover, a software program product is proposed, in which a software code for changing settings of applications implemented in a mobile terminal is stored. When running in a processing unit of a mobile terminal, the software code realizes the step of receiving information on a current position of the mobile terminal, the step of retrieving a stored configuration, which configuration is associated to a location identified by the received position information and which configuration defines at least one setting for at least one application implemented in the mobile terminal, and the step of changing settings of applications implemented in the mobile terminal according to the retrieved configuration.

Finally, a method of changing settings of applications implemented in a mobile terminal is proposed. The method comprises at a controlling portion of the mobile terminal as a first step receiving information on a current position of the mobile terminal. As a second step, the proposed method comprises retrieving a stored configuration, which configuration is associated to a location identified by the received position information and which configuration defines at least one setting for at least one application implemented in the mobile terminal. The proposed method comprises as a last step changing settings of applications implemented in the mobile terminal according to the retrieved configuration.

The invention proceeds from the idea that the settings for various applications of a mobile terminal could be stored in common in a respective configuration. The invention further proceeds from the idea that the settings could be changed automatically depending on the respective location of the mobile terminal, when stored configurations are associated to different locations.

It is an advantage of the invention that the user of a mobile terminal has to define the settings for a specific location only once, not each time when reaching this location.

It is further an advantage of the invention that all settings defined in a stored configuration are changed automatically when a location associated to this configuration is reached. The user can thus not forget anymore to change settings as desired. Thereby, the mobile terminal can be used effectively and diversely.

It is further an advantage of the invention that there is no need to save settings and location information to different applications of the mobile terminal. Consequently, extra software needed for saving the locations and the settings to the applications can be avoided.

Current applications of mobile terminals will support the invention after slight changes. Future applications could work without any software changes or additions. The applications do not have to understand the position information. The new applications can simply register and use the service provided by the invention.

In a possible embodiment of the invention, the storage portion enables further a storage of definitions of an action, wherein each stored definition of an action is associated to at least one location. The definition of an action can be associated separately to at least one location or together with an equally stored configuration. The controlling portion retrieves automatically as well a definition of an action from the storage portion, in case such a definition is associated to a location identified by a received position information. The controlling portion then causes an action corresponding to the retrieved definition.

In an advantageous embodiment of the invention, the proposed device comprises in addition a user interface portion, which can be used for controlling the proposed change of settings in various ways. For example, a user interface portion may enable a user to add or amend information stored in the storage portion, e.g. configurations or definitions of actions. A user interface portion may also enable a user to switch off the automatic change of settings performed by the controlling portion. Further, a user interface portion may enable a user to assign different priorities to different locations, since different locations may be overlapping. A smaller location may even lie entirely within a larger location. In case a plurality of locations are identified by a position information, the controlling portion can then retrieve a configuration from the storage portion, which is associated to the location to which the highest priority was assigned.

The storage portion advantageously comprises a first database for storing the configurations and a second database for storing information on different locations. By using two separate databases, the same configuration may be used for several locations, if each entry in the second database refers to one of the entries in the first database. The controlling portion may then actively determine whether a terminal is entering or leaving a location defined in the second database, and one of the configurations stored in the first database is selected automatically by the controlling portion in case of a match found in the second database. In the first database, in addition definitions of actions may be stored, either as separate entries or in a single entry together with a respective configuration.

The storage portion further comprises advantageously a default entry defining a specific behaviour. The default entry can be used by the controlling portion for acting according to the defined behaviour, in case a received position information identifies a location for which no entry is stored. The defined behaviour may comprise for instance changing settings, but equally other actions like generating notifications or requesting an input from the user of the device.

In case the device according to the invention is a mobile terminal, it comprises advantageously in addition at least one positioning component for determining a current position of the mobile terminal. In the positioning components, different positioning methods can be implemented. Several positioning components can be connected via a location framework to the controlling portion for providing the required position information.

In case the mobile terminal comprises a communication component for exchanging data with a network, the terminal may further receive predefined configurations and predefined location information from a network for storage in the storage portion. Such a network could moreover provide the mobile terminal with a rough position or area information, e.g. based on the Cell ID (identification) or on Bluetooth™. This would allow use of the same controlling module as well in mobile terminals in which a location framework or a positioning components are not available. In the future, it might also be possible that a mobile terminal receives certain positioning information or a positioning information package using commercial services through an IP (Internet Protocol) network, SMS (Short Message Service), MMS (Multimedia Message Service) or e-mail from a network.

The invention can be employed for various mobile terminals, for various settings and/or actions and for various location dependent requirements. A few practical examples will be presented in the following. The mobile terminal can be for example a mobile phone, a PDA (Personal Digital Assistant), a hand-held terminal or a laptop terminal. Even vehicles, like bicycles, private or rented cars, taxis, buses, boats, ships, airplanes etc., can be considered to constitute a kind of a mobile terminal. Nowadays, quite many of these vehicles have also a method for defining the location of the "terminal". Changeable settings are, among others, IP settings, WLAN settings for different networks, terminal profile settings, contact database settings, privacy and security settings, IrDA (Infrared Device Adapter) and Bluetooth™ settings.

The invention can thus be used for instance for changing automatically the settings of a laptop and of its applications when entering the office and when arriving at home. Also application settings in the desktop of a terminal could be changed based on the location of terminal. A different homepage may be used at home and in the office, a different email access may be enabled for work-email and home-email, and different contacts may be provided by a contacts database at home and in the office.

Moreover, when the user leaves home or any other predetermined location, the terminal could remind the user that the doors should be locked or that they are not locked according to a defined action. Similarly, the terminal could remind a user leaving a predetermined location that the lights should be switched off or are not switched off, etc. Instead of reminding a user of some action or in addition to reminding a user of some action, a service in the terminal could also perform itself such an action, like locking doors or switching off lights, automatically, when the user leaves a predetermined location. To this end, the terminal has to communicate with a locking/controlling system and/or a security system which has been installed for the location, e.g. for a house or a vehicle.

Privacy and security settings may indicate for example to whom position information relating to some location is provided, or they may include a fly mode in which the terminal is switched off. Moreover, many hospitals have areas where mobile phones should be switched off, which can be taken care of automatically by the invention. It is also a privacy issue whether a user wants to use the pin-code of a SIM-card or not depending on the current location of the terminal.

A change of Bluetooth™ settings may activate a Bluetooth™ positioning in those places in which it is possible. Different Bluetooth™ settings could also be desired for different meeting rooms. Further, the Bluetooth™ settings could allow sending advertisements by Bluetooth™ to the user if the user is located in a shop.

The change of settings and the caused actions may also relate to some future services. For example, in parking places, free parking boxed or extra prices may be indicated, etc. Further, the invention may be used in a system which allows to rent a vehicle through a mobile terminal and to reserve the closest free car, city-car or van. The owner of such a system could also be a community or a city.

Moreover, in some sports, activities or games, people try to navigate based on instructions which are collected from points that are marked in a pre-defined manner. With a future service, these points could be marked as coordinates and following actions and/or instructions can be delivered directly to the mobile terminal of players when they arrive at a location to which a definition of such a delivery is associated. When the delivery of actions and/or instructions is defined as action in the storage portion, a physical marking of the location is not required any more.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
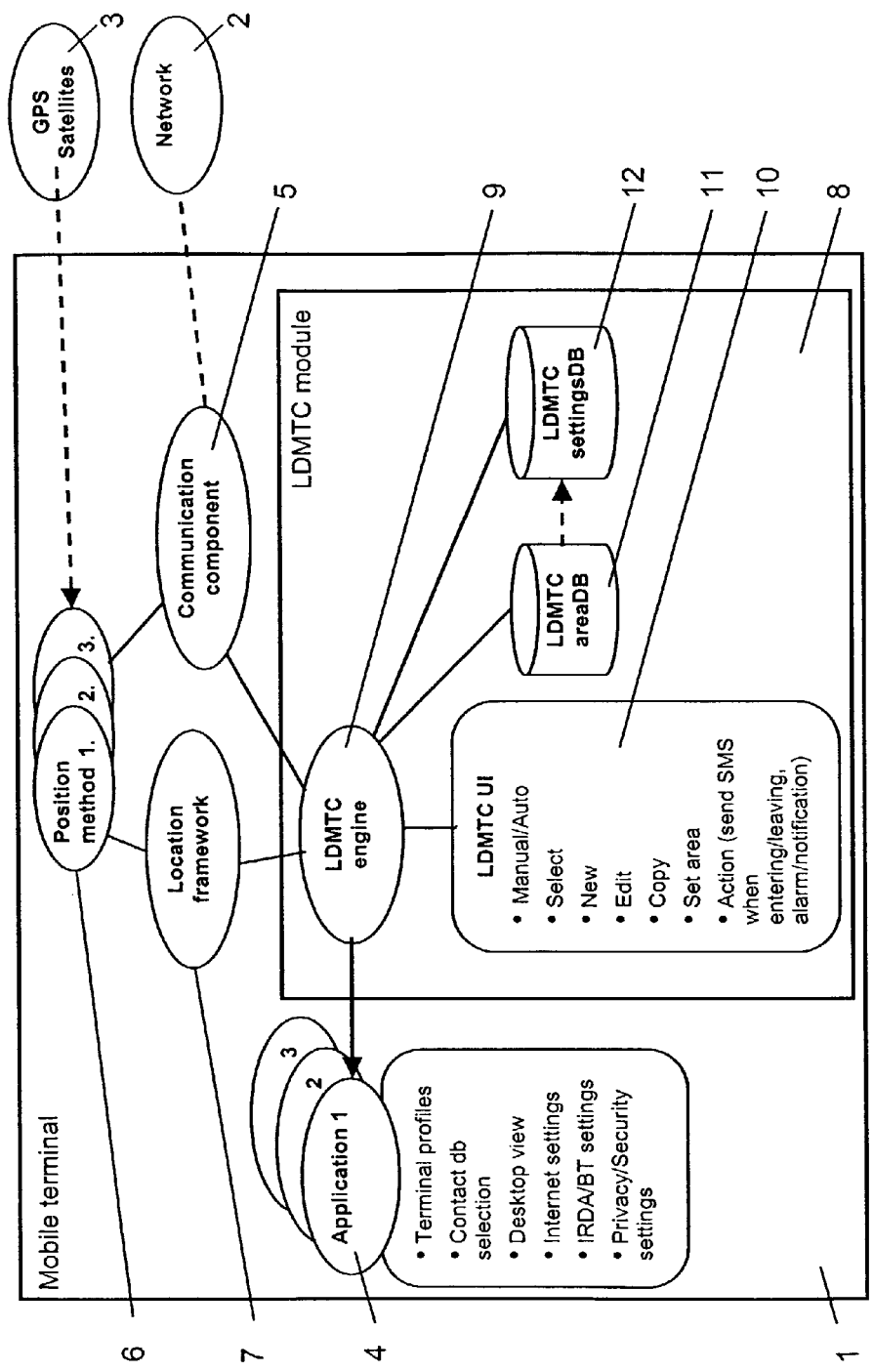
FIG. 1 is a schematic block diagram of a embodiment of a system according to the invention.

FIG. 1 schematically presents a system according to the invention comprising a mobile terminal 1, a mobile communication network 2 and a plurality of GPS satellites 3. In the mobile terminal 1, various applications 4 are implemented, and the system enables an automatic change of settings of these applications 4 in dependence on the respective location of the mobile terminal 1.

The terminal settings may include by way of example terminal profiles, the selection of a contact database, the settings of a desktop view, Internet settings, IrDA/Bluetooth™ settings and Privacy/Security settings.

The mobile terminal 1 comprises a communication component 5 for communicating with the mobile communication network 2 and a plurality of positioning components 6. In each positioning component 6, a different positioning method is implemented. The implemented positioning methods may comprise for instance terminal based positioning methods like a GPS based positioning method, network based positioning methods like an E-OTD (Enhanced Observed Time Difference), a Cell-ID or a Bluetooth™ based positioning method, and/or network assisted positioning methods like an A-GPS (Assisted GPS) based positioning method. In the presented embodiment, at least a GPS based positioning method and at least one network based or network assisted positioning method is implemented in a respective one of the positioning components 6. For the at least one network based and/or network assisted positioning method, the communication component 5 is connected to at least one of the positioning components 6. The mobile terminal 1 further comprises a location framework 7, which can be used for connecting to the different position methods.

In addition, the mobile terminal 1 comprises a location dependent mobile terminal controller LDMTC 8, which is realized as a software module and which comprises all functions required specifically for the invention. The LDMTC 8 includes an LDMTC engine 9, which has access to the terminal settings and which is connected to the communication component 5 and to the location framework 7. The LDMTC 8 moreover includes an LDMTC user interface (LDMTC UI) 10 for controlling the LDMTC 8, an LDMTC area database DB 11 for storing area information and an LDMTC settings database DB 12 for storing information for terminal settings and actions defined in saved configurations. The LDMTC user interface 10, the LDMTC area database 11 and the LDMTC settings database 12 are connected to the LDMTC engine 9. The LDMTC 8 controls all terminal settings that a user has defined in the LDMTC settings database 12.

Figure 2:
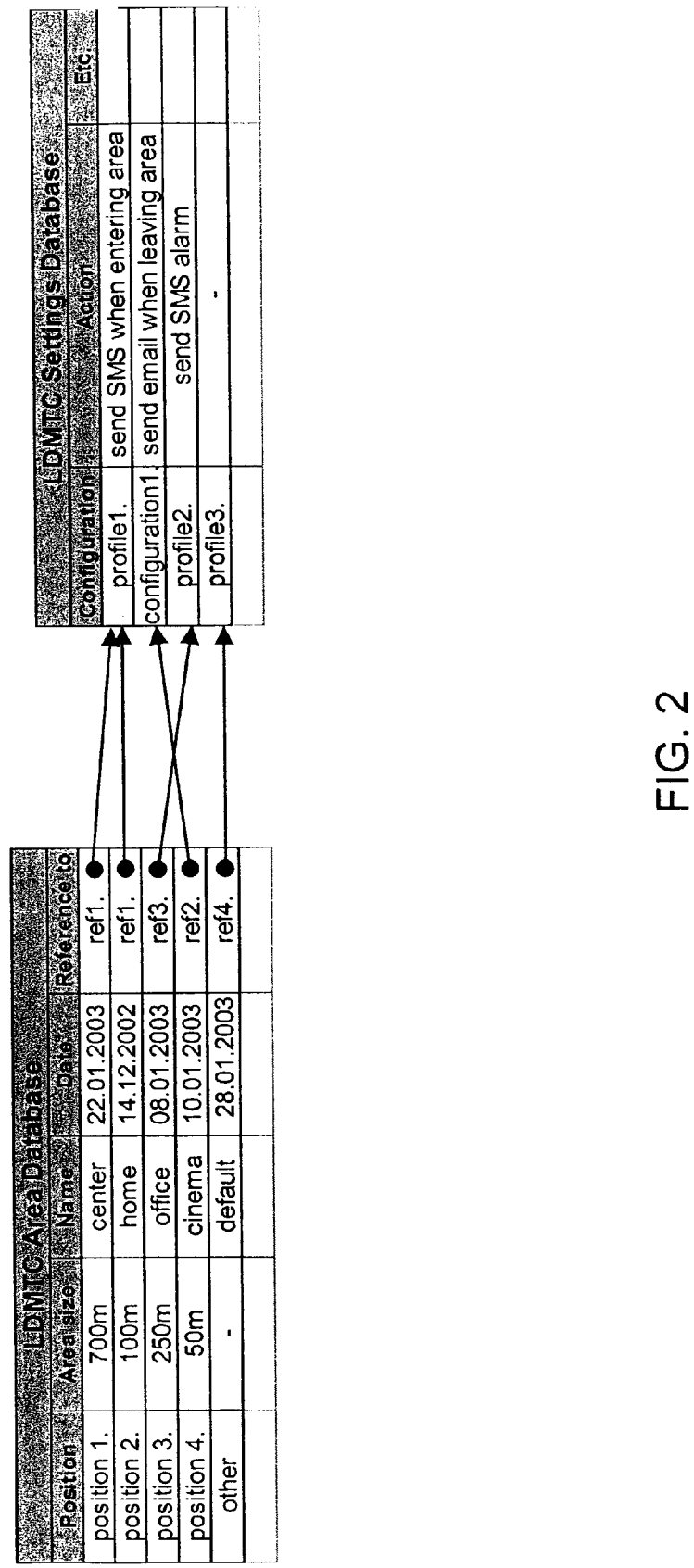
FIG. 2 is a table illustrating the structure of databases used in a mobile terminal of the system of FIG. 1.

The structure of the LDMTC area database 11 and the structure of the LDMTC settings database 12 are shown in FIG. 2.

The structure of the LDMTC area database 11 is presented on the left hand side of FIG. 2. Each entry in this database comprises a position defined by its degrees of longitude and latitude, the area size of a location at this position, a name for the location, the date at which the entry was generated or updated, and a reference to an entry in the LDMTC settings database.

The structure of the LDMTC settings database is presented on the right hand side of FIG. 2. Each entry in this database comprises a configuration defining a plurality of settings. In addition, each entry may comprise the definition of an action and other details.

Among the presented exemplary entries for the LDMTC area database 11, a first entry is an entry for "position 1", generated on Jan. 22, 2003. The location is named "center" and has an area size of 700 m. The entry comprises a reference "ref1" to the first entry in the LDMTC settings database 12. A second entry in the LDMTC area database 11 is an entry for "position 2", generated on Dec. 14, 2002. The location is named "home" and has an area size of 100 m. The entry comprises equally a reference "ref1" to the first entry in the LDMTC settings database 12. A third entry in the LDMTC area database 11 is an entry for "position 3" generated on Jan. 8, 2003. The location is named "office" and has an area size of 250 m. The entry comprises a reference "ref3" to the third entry in the LDMTC settings database 12. A fourth entry in the LDMTC area database 11 is an entry for "position 4" generated on Jan. 10, 2003. The location is named "cinema" and has an area size of 50 m. The entry comprises a reference "ref2" to the second entry in the LDMTC settings database 12. A fifth entry in the LDMTC area database 11 is an entry for any "other" position, generated on Jan. 28, 2003. Correspondingly, the location is named "default", and an area size is not defined. The entry comprises a reference "ref4" to the fourth entry in the LDMTC settings database 12.

Among the presented exemplary entries for the LDMTC settings database 12, a first entry comprises a "profile 1" as a configuration. Further, an action is defined in this first entry. It is defined more specifically that an SMS is to be sent when the mobile terminal enters an area for which an entry in the LDMTC area database 11 refers to the first entry of the LDMTC settings database 12. In the second entry in the LDMTC settings database 12, a "configuration 1" is defined as a configuration. Also in the second entry, an action is defined. In this case, an email is to be sent when the terminal 1 leaves an area for which an entry in the LDMTC area database 11 refers to the second entry of the LDMTC settings database 12. In the third entry in the LDMTC settings database 12, a "profile 2" is defined as a configuration. Also in the third entry, an action is defined. In this case, an SMS alarm is to be sent when this third entry is selected. In the fourth entry in the LDMTC settings database 12, a "profile 3" is defined as a configuration. In the fourth entry, no action is defined.

Before a user of the mobile terminal 1 can benefit from the LDMTC 8, he/she has to define some configurations in the databases 11, 12.

When a user reaches for the first time a location for which he/she desires specific settings, he/she opens an application for an LDMTC configuration via the LDMTC UI 10. The location can be for example school, a classroom, a meeting room, home, the workplace, a cinema, a private car etc. The application for the LDMTC configuration is running in the LDMTC engine 9.

The LDMTC engine 9 requests the current position from the location framework 7. The location framework 7 receives the current position from a currently active positioning component 6. In the situation depicted in FIG. 1, a positioning is performed in one of the positioning components 6 based on satellite signals received from the GPS satellites 3 and/or based on positioning information received from the network 2 through the communication component 5. The resulting position information is forwarded via the location framework 7 and/or the communication component 5 to the LDMTC engine 9.

The LDMTC engine 9 moreover asks the user to set an LDMTC configuration for the received position information.

The user selects the terminal profile, the contact database, the desktop view, the IP settings, the privacy and security settings for location technologies and terminal usage, the preferred location technology settings, the frequency of the positioning information update, the terminal security settings, etc., which are always to be used at the current location. This selection is entered by the LDMTC engine 9 as a new configuration entry to the LDMTC settings database 12. Further, the user may define an action for the current location, like sending an SMS when entering or leaving the location or generating an alarm or a notification. The defined action could also be a user verification, i.e. a user is requested to accept or reject a presented option. An acceptance may then generate a new action, e.g. through a commercial service which the user has pre-defined.

In case the desired configuration, part of the desired configuration or a desired action has already been defined before for another location, the user may also use a copying function for assembling all desired information for the entry. In case exactly the same entry is to be used as for another location for which a configuration was defined previously, this entry is simply selected by the user.

In addition, the user is requested to input a name for the current location and the size of the location. Name and size are entered by the LDMTC engine 9 to the LDMTC area database 11 together with the determined position information and the date of entry. The LDMTC engine 9 equally associates a reference to the newly generated entry or the selected old entry of the LDMTC settings database 12.

Similarly, existing entries of the two databases 11, 12 can be amended by a user via the LDMTC user interface 10.

Alternatively, the LDMTC engine 9 could download via the communication component 5 predefined positioning and/or settings packages from the mobile communication network 2, e.g. using commercial network services. Such packages may be provided for instance by e-mail, SMS, MMS or setup files and comprise all location information for a current location and/or a configuration commonly desired at the current location.

Next time the user arrives at the newly entered location, all terminal settings will automatically follow the LDMTC configuration that has been defined for this location, as will be explained in the following with reference to FIG. 3.

The LDMTC engine 9 in a step 30 offers to the user by means of the LDMTC user interface 10 the possibility "Manual/Auto" to choose an automatic or a manual selection of settings defined in the LDMTC settings database 12.

In case the user chooses a manual selection, the LDMTC engine 9 waits in a loop until the user chooses an automatic selection again.

In case the user chooses an automatic selection, the LDMTC engine 9 continuously requests a position information from the location framework 7 as shown in a step 32. The location framework 7 provides thereupon the requested position information to the LDMTC engine 9, in case it receives the information from one of the positioning components 6.

In case the location framework 7 is currently not able to provide an information on the position of the mobile terminal 1, the LDMTC engine 9 returns to the beginning of the procedure, checking again in the step 30 whether a manual or an automatic setting was chosen.

In this loop, some kind of a timeout parameter could be provided. If the location framework 7 is not able to provide any position information within a period of time defined by the timeout parameter, the location framework 7 could generate for example a verification for the user, requesting what to do next. The user may choose thereupon to select a preferred configuration manually. The selected configuration is then used until the location framework 7 has position information available again.

Preferably, the user is able to select for each configuration stored in the LDMTC settings database 12 a maximum time which is accepted without positioning information when this configuration is in use. If the user goes to the cinema, for example, it is very probable that positioning information cannot be obtained until the user leaves the cinema again. Advantageously, there is also an entry in the LDMTC Area database 11 for the case that no position is available after a timeout. In this entry, the user can then define a reference to a specific default configuration in the LDMTC settings database 12 that should be used after a timeout.

In case the location framework 7 is able to provide information on the current position of the mobile terminal 1, as determined in a step 34, the LDMTC engine 9 searches in a step 36 the received position in the LDMTC area database 11. It checks more specifically, whether the current position corresponds to one of the stored positions with a maximum deviation defined by the respectively associated area size. In case the LDMTC engine 9 does not find any matching entry in the LDMTC area database 11, the LDMTC engine 9 returns to the beginning of the procedure as shown in a step 38.

In case the LDMTC engine 9 finds a matching entry in the LDMTC area database 11, the LDMTC engine 9 reads the entry in the LDMTC settings database 12 to which the reference in the matching entry in the LDMTC area database 11 refers as shown in a step 40. The current position may for example correspond with a deviation of less than 50 m to "position 4" stored in the LDMTC area database 11 for some "cinema". The associated reference is "ref2", which refers to the second entry of the LDMTC settings database 12. The LDMTC engine 9 therefore retrieves from the LDMTC settings database 12 the configuration defined in the second entry, "configuration 2", and in addition the action defined in this entry, "send email when leaving area".

The LDMTC engine 9 now changes the settings of the applications 4 implemented in the mobile terminal 1 as defined in the retrieved configuration information. It has to be noted that the depicted applications 4 may comprise not only an original default set of applications, but in addition extra applications which have been registered to the LDMTC 8 later on.

Further, the LDMTC engine 9 executes any action defined to be executed when the area of the current position is entered as shown in a step 42. In addition, the LDMTC engine 9 buffers any action defined to be executed when the area of the current position is left. Then, the LDMTC engine 9 returns to the beginning of the procedure.

The buffered actions are executed by the LDMTC engine 9 when a new available position information results in no match or in another match than for the current position in the LDMTC area database 11. For example, the current position could be home. The LDMTC 8 could be configured to check each time when the user leaves the home area whether all doors are locked, all lights are turned off, etc. If the LDMTC 8 finds any contradiction against this configuration, it notifies the user or requests a verification from the user. In some embodiment, the LDMTC 8 could even be designed to lock unlocked doors automatically, when the home area is left.

Figure 3:
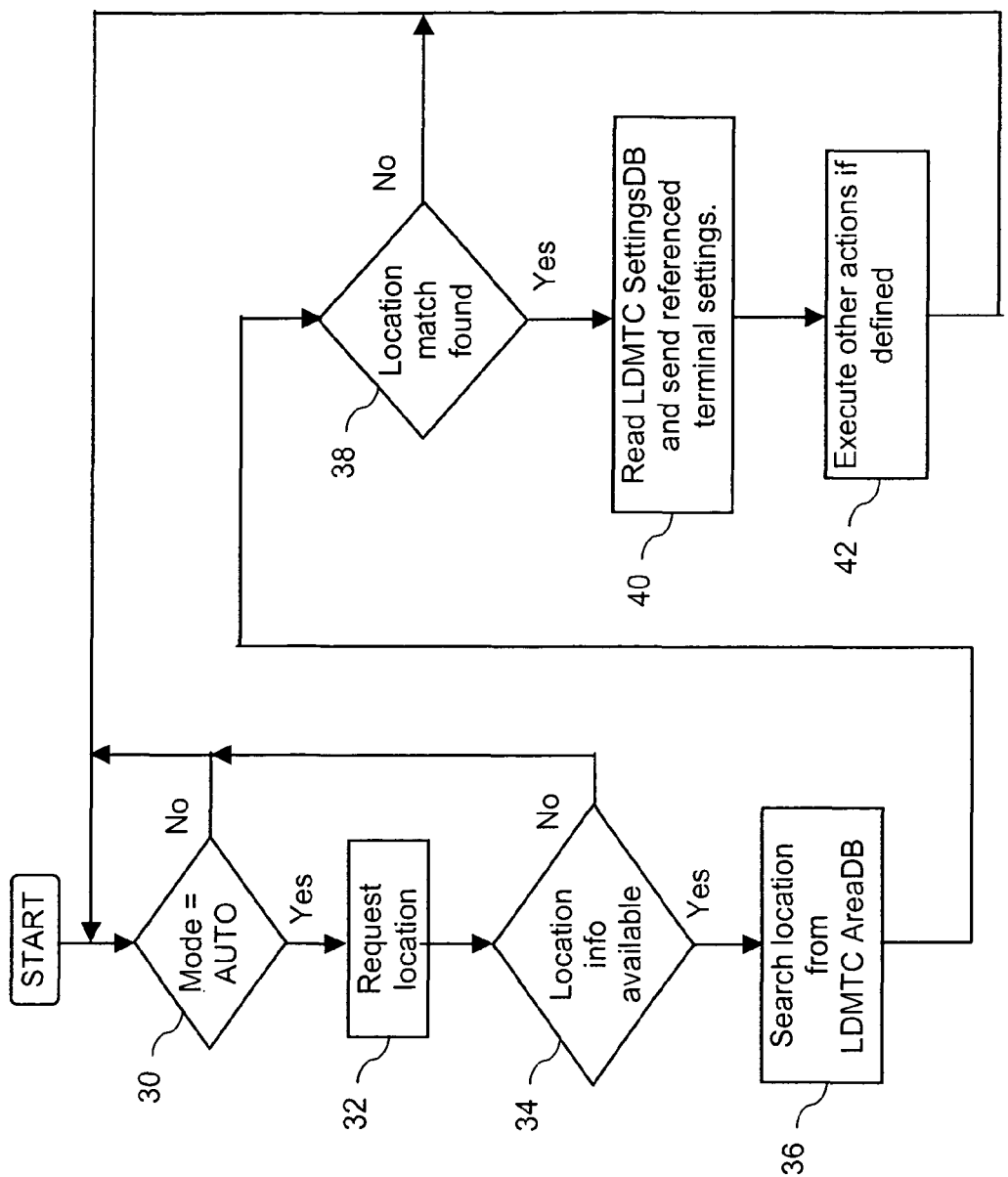
FIG. 3 is a flow chart illustrating a method which is implemented in the mobile terminal of the system of FIG. 1.

In case the user chooses a manual selection of settings defined in the LDMTC settings database 12, the position dependent automatic functions described with reference to FIG. 3 are not activated, as mentioned above. Instead, the LDMTC user interface 10 offers the user the possibility to select a particular configuration from the LDMTC settings database 12. This is of advantage, in case a user wants to deviate from the configuration defined for a current location. Further, it allows use of the same LDMTC module 8 in a terminal which does not have any position technologies. The user can then select him/herself a stored position dependent or independent configuration. Even in the latter case, benefits are achieved with the LDMTC module 8, since all terminal settings desired for a specific position, area or situation can be selected by a single action.

For a manual selection, the LDMTC module 8 may offer the possibility to select directly a configuration stored in the LDMTC settings database 12, or indirectly by selecting an entry in the LDMTC area database 11, which can be identified more easily by the name associated to a specific position.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device enabling a change of settings of applications implemented in a mobile terminal, said device comprising:
   a storage portion for storing a plurality of configurations, wherein at least one of the stored configurations is associated to at least one location and defines at least one setting for at least one application implemented in a mobile terminal; and
   a controlling portion for receiving information on a current position of a mobile terminal, for retrieving automatically a configuration associated to a location identified by said position information from said storage portion, said controlling portion being adapted to retrieve, in case a plurality of locations are identified by said position information, a configuration which is associated to an identified location to which a highest priority was assigned, and for changing settings of applications implemented in said mobile terminal according to said retrieved configuration.

2. A device according to claim 1, wherein said storage portion enables further a storage of definitions of an action, wherein each stored definition of an action is associated to at least one location, and wherein said controlling portion further retrieves automatically a definition of an action associated to a location identified by a received position information from said storage portion and causes an action corresponding to said retrieved definition.

3. A device according to claim 2, further comprising a user interface portion enabling a user to define an action for a specific location, which definition is stored by said controlling portion in said storage portion and associated to said specific location.

4. A device according to claim 1, further comprising a user interface portion enabling a user to define a new configuration for a new location, which new configuration is stored by said controlling portion in said storage portion and associated to said new location.

5. A device according to claim 1, further comprising a user interface portion enabling a user to amend a configuration stored in said storage portion via said controlling portion.

6. A device according to claim 1, further comprising a user interface portion enabling a user to switch off said automatic change of settings performed by said controlling portion.

7. A device according to claim 6, wherein said user interface portion is for enabling a user to manually select a configuration stored in said storage portion, said controlling portion changing settings of applications implemented in a mobile terminal according to said selected configuration.

8. A device according to claim 1, further comprising a user interface portion enabling a user to define a name for a specific location, which name is stored by said controlling portion in said storage portion for said specific location.

9. A device according to claim 1, further comprising a user interface portion enabling a user to define a size of a specific location, which size is stored by said controlling portion in said storage portion together with a position information for said specific location, and wherein said controlling portion assumes a specific location to be identified by a received position information, when the position information defines a position which lies within an area defined by a stored position information and an associated size.

10. A device according to claim 1, further comprising a user interface portion enabling a user to assign different priorities to different locations.

11. A device according to claim 1, wherein said storage portion comprises a first database for storing said configurations and a second database for storing information on different locations, wherein each entry for a specific location in said second database comprises a reference to an entry in said first database, and wherein an entry in said second database can be selected by said controlling portion based on received position information.

12. A device according to claim 11, wherein said first database enables in addition a storage of definitions of an action.

13. A device according to claim 1, wherein said storage portion comprises a default entry defining a specific behaviour, which default entry is used by said controlling portion for acting according to said defined behaviour, in case a received position information does not identify a location to which an entry stored in said storage portion is associated.

14. A device according to claim 1, wherein said device is a controller module for a mobile terminal.

15. A device according to claim 1, wherein said device is said mobile terminal.

16. A device according to claim 15, further comprising at least one positioning component, in which a positioning method for determining a current position of said mobile terminal is implemented, and a location framework for receiving position information from said at least one positioning component and for providing received position information to said controlling portion.

17. A device according to claim 15, further comprising a communication component for receiving from a network predefined configurations for storage in said storage means.

18. A device according to claim 15, further comprising a communication component for receiving from a network predefined location information for storage in said storage means.

19. A device according to claim 15, further comprising a communication component for receiving from a network a position information and for forwarding said position information to said controlling portion to enable said controlling portion to automatically retrieve an entry associated to a location identified by said position information from said storage portion.

20. The device of claim 1, said controlling portion being adapted to retrieve, in case said plurality of locations identified by said position information overlap.

21. A system comprising a mobile terminal with:
a storage portion for storing a plurality of configurations, wherein at least one of the stored configurations is associated to at least one location and defines at least one setting for at least one application implemented in said mobile terminal; and
a controlling portion for receiving information on a current position of said mobile terminal, for retrieving automatically a configuration associated to a location identified by said position information from said storage portion, said controlling portion being adapted to retrieve, in case a plurality of locations are identified by said position information, a configuration which is associated to an identified location to which a highest priority was assigned, and for changing settings of applications implemented in said mobile terminal according to said retrieved configuration;
said system further comprising at least one unit transmitting signals to said mobile terminal, which signals enable said mobile terminal to provide information on a current position of said mobile terminal as position information to said controlling portion.

22. A system of claim 21, said controlling portion being adapted to retrieve, in case said plurality of locations identified by said position information overlap.

23. A method of changing settings of applications implemented in a mobile terminal, said method comprising at a controlling portion of said mobile terminal:
receiving information on a current position of said mobile terminal;
retrieving a stored configuration, which configuration is associated to a location identified by said received position information and which configuration defines at least one setting for at least one application implemented in said mobile terminal, wherein in case a plurality of locations are identified by said position information, a configuration is retrieved which is associated to an identified location to which a highest priority was assigned; and
changing settings of applications implemented in said mobile terminal according to said retrieved configuration.

24. The method of claim 23, wherein said plurality of locations are overlapping.

* * * * *